(12) United States Patent
Schroeder et al.

(10) Patent No.: US 11,844,165 B2
(45) Date of Patent: Dec. 12, 2023

(54) LAMP CONTROL MODULE CONSISTING OF BASE AND CONTROL PARTS, COMMUNICATING VIA NFC

(71) Applicant: Schreder S.A., Brussels (BE)

(72) Inventors: Helmut Schroeder, Wiesbaden (DE); Daniel Brand, Cologne (DE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 17/344,270

(22) Filed: Jun. 10, 2021

(65) Prior Publication Data

US 2021/0345472 A1 Nov. 4, 2021

Related U.S. Application Data

(63) Continuation of application No. 16/069,293, filed as application No. PCT/EP2016/052564 on Feb. 5, 2016, now abandoned.

(51) Int. Cl.
*H05B 47/19* (2020.01)
*H01Q 1/22* (2006.01)
(Continued)

(52) U.S. Cl.
CPC .......... *H05B 47/19* (2020.01); *H01Q 1/2208* (2013.01); *H01Q 1/00* (2013.01); *H01Q 1/40* (2013.01);
(Continued)

(58) Field of Classification Search
CPC . H01Q 1/00; H01Q 11/08; H01Q 9/27; H01Q 1/40; H01Q 25/00; H01Q 1/2208; H01Q 1/526; H05K 1/00; H05B 47/19; H05B 47/195; H04W 4/80; F21V 23/0435; F21Y 2115/10
See application file for complete search history.

(56) References Cited

U.S. PATENT DOCUMENTS

| 8,915,447 B2 * | 12/2014 | Jain | H04M 15/68 235/492 |
| 2003/0015478 A1 * | 1/2003 | Kuennen | H05B 47/19 210/748.11 |

(Continued)

*Primary Examiner* — Abdullah A Riyami
*Assistant Examiner* — Syed M Kaiser
(74) *Attorney, Agent, or Firm* — McDonnell Boehnen Hulbert & Berghoff LLP

(57) ABSTRACT

A control arrangement includes a control module and a control module base for mounting the control module to an external surface of a luminaire. The control module includes a contacts; the control module base includes a base body portion having first and second surfaces and a lateral surface between the first and second surfaces, wherein at least one recess is provided on the first surface and configured for receiving the control module contacts. The control module base includes a near-field communication means including information relating to the specification of the luminaire. The control module includes a near-field communication unit configured to read out information in the near-field communication means of the control module base. The control module includes a communication unit configured for communicating said information to at least one of another control module, a segment controller configured for controlling a group of control modules, and a server.

6 Claims, 6 Drawing Sheets

Figure 1:
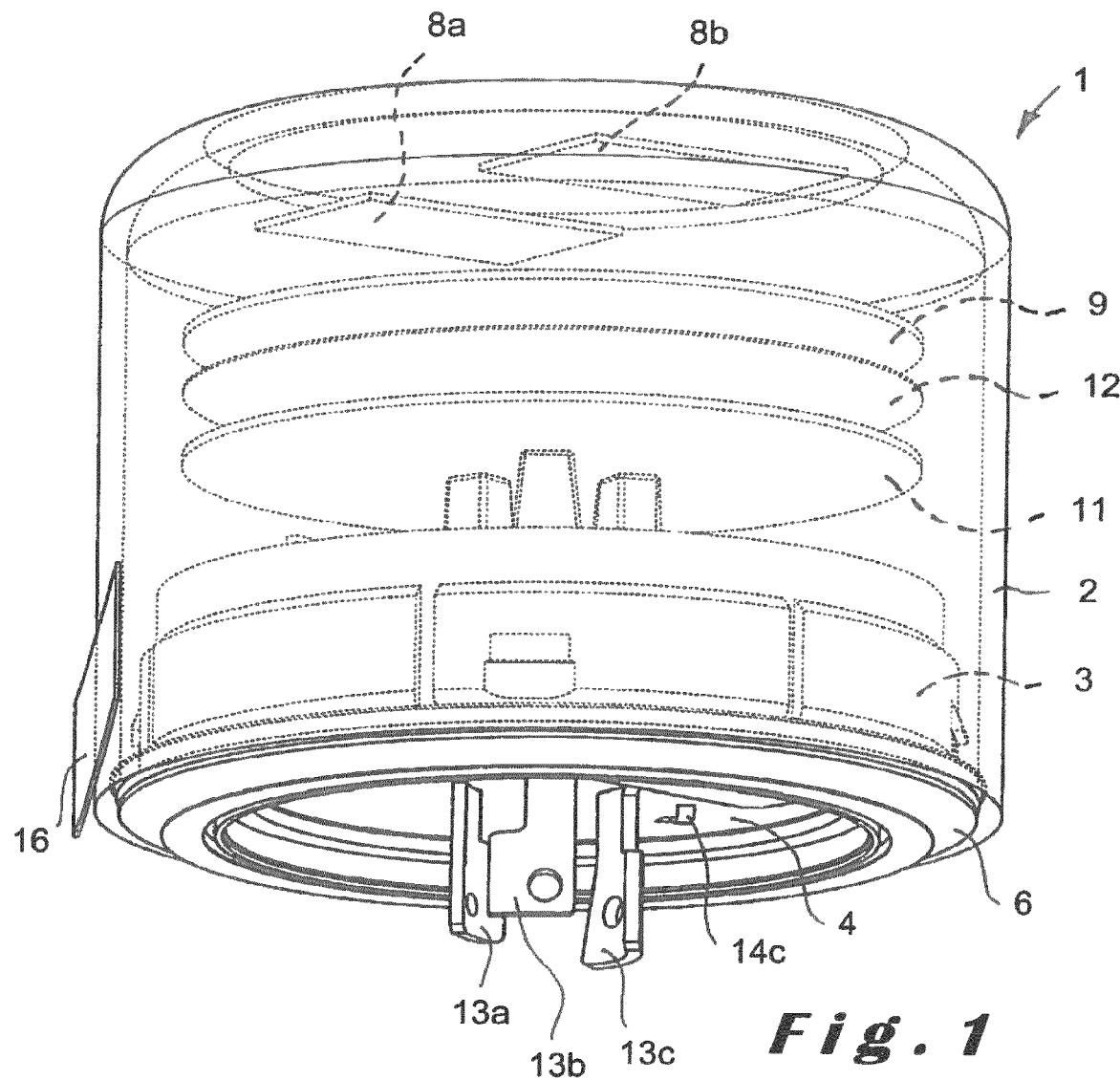

(51) Int. Cl.
*H01Q 1/00* (2006.01)
*H01Q 1/40* (2006.01)
*H01Q 1/52* (2006.01)
*H05B 47/195* (2020.01)
*H04W 4/80* (2018.01)

(52) U.S. Cl.
CPC .............. *H01Q 1/526* (2013.01); *H04W 4/80* (2018.02); *H05B 47/195* (2020.01)

(56) References Cited

U.S. PATENT DOCUMENTS

| | | | | |
|---|---|---|---|---|
| 2008/0242346 | A1* | 10/2008 | Rofougaran | H04B 1/0458 |
| | | | | 455/552.1 |
| 2009/0222223 | A1* | 9/2009 | Walters | H05B 47/22 |
| | | | | 315/129 |
| 2010/0213876 | A1* | 8/2010 | Adamson | A47F 11/10 |
| | | | | 315/312 |
| 2010/0296285 | A1* | 11/2010 | Chemel | F21V 21/00 |
| | | | | 362/249.1 |
| 2011/0266345 | A1* | 11/2011 | Fowler | H05B 47/19 |
| | | | | 235/492 |
| 2013/0264971 | A1* | 10/2013 | Yeh | H05B 47/19 |
| | | | | 315/312 |
| 2015/0115807 | A1* | 4/2015 | Schroder | H05B 45/12 |
| | | | | 315/307 |
| 2017/0249628 | A1* | 8/2017 | Douglas | G07F 7/084 |

\* cited by examiner

LAMP CONTROL MODULE CONSISTING OF BASE AND CONTROL PARTS, COMMUNICATING VIA NFC

The present invention relates to improvements in or relating to control module arrangements.

A control module arrangement comprises a control module and a control module base for fastening the control module to the outside of a luminaire housing. The use of a control module provides the means by which a luminaire can be integrated into a luminaire network and, in addition, into a luminaire management system. The control module base has a base body which can be at least partially in the form of a solid body and which is provided with at least one fastening means for fastening the control module on the top side thereof. The fastening means may comprise latching means, recesses for complementary latching means of the control module or screw-connection means, the fastening means being arranged on a top side or face of the control module base, recessed in the top face thereof or else present on a lateral surface of the control module base, for example, such that the control module is arranged to be aligned with the top side or face. In this case, the top side or face is intended to be understood as meaning the side of the control module base which is directed away from a surface of the luminaire housing from which the base projects or on which the base is fastened. A lateral surface of the control module base, when it is of substantially cylindrical form, for example, then stands on the surface of the luminaire housing at an angle.

The control module bases comply with ANSI Standard C-136.10 or C-136.41 and are also called or known as "NEMA sockets". It goes without saying that control module bases with any other desired dimensions and equipment are covered by the subject matter of the invention described in more detail below.

Control module bases of this kind, according to the prior art, are used to arrange dimmer switches, for example, on the top sides of luminaires, which can be used to control simple switch on/switch off operations of the luminaire.

The present invention further relates to a control module for integrating a luminaire into a luminaire network and which is configured for fixing to a pre-designated control module base, the control module having a plurality of electrical and/or electronic components by means of which the luminaire can be integrated into the luminaire network and by means of which the luminaire can be controlled. Finally, the invention relates to an arrangement comprising a control module base and an associated control module.

It is known from the prior art that luminaires, for example, street luminaires, have increasingly more intelligent control systems. Street luminaires which are equipped with integrated control modules can, for example, together with other luminaires, form networks which can be controlled by means of a server with a management console and also by means of at least one associated segment controller. In this case, luminaires can be retrofitted and newly equipped with control modules of this kind by means of fitting the control modules to the outside of control module bases which are arranged on the luminaire housing. One disadvantage is that the persons responsible for ordering the luminaires are often different persons to those ordering the control modules. Furthermore, yet further different personnel are generally used to mount the luminaires and/or control modules on site. Luminaire-specific information which is relevant for operating the luminaire, for example, the type of lighting means, the type of housing and other information which is relevant for operating the lighting means, then has to be manually input when integrating the control module during commissioning of the luminaire. To this end, corresponding information has to be provided on the luminaire. The information is then manually transferred to a corresponding registration device during assembly and generally has to be transferred from this registration device to a server.

The object of the present invention is to simplify commissioning of the luminaire. This object is achieved by a control module base according to Claim 1, by a control module according to Claim 10 and by an arrangement comprising a control module base and a control module according to Claim 18. Advantageous refinements of the invention can be determined from the dependent claims and from the following description.

A control module base according to the invention is distinguished in that it is provided with a near-field communication (NFC) means which contains at least one item of information relating to the specification of the luminaire or to which at least one item of information can be written. The near-field communication means is a battery-free, preferably passive means, which is designed for transmitting information in a contactless manner and which is based, for example, on radio frequency identification (RFID) technology, Bluetooth Low Energy (BLE) technology, infrared technology or other wireless near-field transmission technologies. [Bluetooth is an open wireless technology standard for exchanging data over short distances (using short-wavelength radio transmissions in the industrial, scientific and medical (ISM) bands from 2400 to 2480 MHz) from fixed and mobile devices. Bluetooth can be used to create personal area networks (PANs) with high levels of security. Bluetooth is managed by the Bluetooth Special Interest Group (SIG).] The technology used has a limited range of preferably a few metres for near-field transmission. In particular, the technology used for near-field communication can be supplied with energy which is drawn by means of energy-harvesting means which are arranged in the control module base.

The term "control module base" as used herein is intended to refer to a separable base portion of a control module which is mountable on or at least partially within a luminaire housing. The base portion or control module base is also referred to as "a base body" herein. The control module base comprises a generally cylindrical component having an upper or first surface to which a control module is mounted, a lower or second surface which is mounted to a luminaire housing, and a lateral or peripheral or third surface between the first and second surfaces.

Due to the presence of near-field communication means, a person charged with mounting the control module to a luminaire on site is able to read out information relating to the specification of the luminaire in an automated manner from the control module base which is connected to the luminaire. A person responsible for producing the control module base can also leave the luminaire-specific information on the control module base or write the luminaire-specific information to the near-field communication means when installing the control module to the luminaire housing.

In this case, the term "near-field communication means" is intended to be understood as meaning a near-field communication means which can be used to exchange data in a contactless manner by radio technology over short distances of, preferably, a few metres and centimetres (up to 1 m) and, in particular, at data rates of not more than a maximum of 450 kbit/sec. In particular, the near-field communication for the present invention is based on RFID technology as is described, for example, in ISO14443 or ISO15693.

The term "luminaire housing" as used herein is intended to refer to the head of the luminaire in which the lighting elements, drivers for the lighting elements and other functionality are located or mounted. The luminaire housing has a surface onto which a control module base or base body can be mounted as will be described in more detail below. Typically, but not exclusively, the surface comprises an upper or top surface of the luminaire housing.

The near-field communication means can be designed such that it can either be written to or not be written to. The information which can be provided on the near-field communication means may comprise, either luminaire-specific data about, for example, dimming parameters or housing types, or can be information relating to the specification of the luminaire in the form of an identifier which is linked to corresponding luminaire-specific data, that is to say, data relating to the specification of the luminaire, in particular, by means of a database and/or in software. Data relating to the specification of the luminaire may include the following information but is not limited thereto: manufacturer, product family, product ID, country, colour temperature, flux density, photometry type, housing type, nominal voltage class, driver manufacturer, driver type, output current range, output voltage range, dimming range and/or a large number of further parameters used to specify the luminaire and/or the constituent parts of the luminaire. The information may also include all or some of the data and/or drawings which are relevant for operation and/or asset management of the luminaire.

After the near-field communication means has been read, the database or the software can be checked by the assembly personnel, or, in an automated manner, so that the luminaire-specific data is made available to the assembly personnel, to a control module and/or generally to a luminaire network.

The term "luminaire network" as used herein is intended to refer to a network of luminaires in which each luminaire has a control module configured for communicating with at least other control modules within its immediate vicinity or for communicating with a segment controller which may be a control module designated for controlling a group of control modules. Additional functionality of the control modules may include communication with a radio network or an internet network.

The term "segment controller" as used herein is intended to refer to a device which controls a group of control modules. A segment controller may comprise a control module which has been selected to control a group of control modules in its vicinity.

The near-field communication means is preferably arranged at least partially on the outside of the base body, thus simplifying subsequent fitting during the mounting process. In addition to the fastening means for mounting the control module on its upper surface (as described above), the base body may also comprise means, on its lower surface (also described above), for fixing it either to and/or partially in a luminaire housing. The control module base may also be arranged on a surface of a luminaire housing which faces downwards in a direction facing the ground or other surface which is to be lit by the luminaire. In this case, the surface of the control module base which is directed away from the luminaire housing comprises the surface of the control module base.

Control module bases which have already been produced may also subsequently be provided with a near-field communication means. In this case, an information carrier is, for example, in the form of a label into which a near-field communication means is integrated, or by means in which a near-field communication means may be arranged, may be attached to or may be integrated with the control module base.

As an alternative or in addition, the near-field communication means may also be at least partially integrated into the base body, so that damage to the near-field communication means due to external influences may be at least minimized or even prevented. In the latter case, the near-field communication means needs to be fully integrated into the base body. At the same time, electrical insulation from any current-carrying parts of the control module base is ensured more effectively in the case of near-field communication means which are fully integrated into the base body.

According to one embodiment of the present invention, the near-field communication means is arranged in an upper region of the control module base. Here, the term "upper region" means the half, or at least a portion, of the base body which is remote from the luminaire housing in the mounted position.

The near-field communication means advantageously comprises an RFID transponder, also called an RFID tag. The associated technology is known, and, despite the comparatively harsh external conditions including large fluctuations in temperature, high radio wave densities, for example, due to mobile telephone masts which may be arranged on the luminaire, or on account of additional antennas of the control module itself, and also given extreme fluctuations in moisture, can surprisingly be used with process reliability on a luminaire which is arranged outdoors.

Furthermore, RFID transponders which are preferably in the form of coils, and, in spite of a restricted size, store a sufficiently large quantity of data, may be used. By way of example, an RFID transponder or tag can be injection-moulded jointly with the base body or encapsulated within the base body during its production using an injection-moulding process.

The near-field communication means may be in the form of a cylinder, particularly when it is to be integrated into the base body. Due to this compact cylindrical shape that includes the coil and transponder circuit, data can be stored in a sufficiently small amount of space and data transmission operations to an operator or to a control module, which will be described below, can be realized with a sufficiently high degree of reliability. The cylindrical form of the near-field communication means enables it to be readily incorporated into the base body, either through a hole provided therein or at the time of manufacture, for example, during an injection moulding process.

Near-field communication means of comparatively simple construction in the form of RFID transponders which can either be written to or not be written to and which have a storage capacity of less than 250 bytes are preferably used. The stored information may be one or more data packets and/or one or more information packets each comprising several data packets. Two items of information in the form of two identifiers (IDs) are preferably stored in one transponder of this kind, where, in particular, at least one identifier comprises a unique identifier (UID). This unique identifier can be used for unambiguously identifying the control module base, whilst an additional ID may comprise a luminaire-specific ID.

By means of a change in the UID, it is possible to identify, in associated software on a server or in an associated control module, the extent to which the control module has been arranged on a new control module base.

Furthermore, the UID may be used to ensure the traceability of the luminaire by means of a data set which is already applied during production of the luminaire. Therefore, a control module base for which the information in the near-field communication means comprises a UID added during manufacture of the luminaire in the factory and which corresponds to a UID entry in a database for subsequent individualisation of the luminaire. This will also be described below in a further exemplary embodiment according to the invention.

According to a further example in accordance with the present invention, only an item of information in the form of an ID which is also linked to luminaire-specific information in software or a database may be stored in the near-field communication means.

The luminaire-specific ID may be stored in associated software and/or a database which is part of the luminaire network or which can be reached by the luminaire network, as early as during assembly of the luminaire with the control module base. In this case, a luminaire network is understood as a network of luminaires which has a plurality of luminaires with control modules which can communicate with one another and/or with a program running on a remote computer unit or server which also forms part of the network.

The control module base is advantageously provided with an information carrier for marking the position of a transponder located therein and/or for positioning the control module thereon, so that, on account of the limited ranges of the technology used, the positioning of the control module and/or the alignment of the near-field communication means on the control module base can be carried out in a fault-free manner.

This information carrier may preferably be arranged on another surface, which is angled away with respect to the top surface, for example, on a lateral surface of the base body, so that the information carrier is also visible in the mounted state of the control module. In the case of any further marking of the control module, the orientation of the control module and the control module base relative to one another can be checked when the control module and control module base are mounted to one another.

The base body is preferably of multipartite construction, that is, having several parts, in which at least one base body part having conductive connection contacts can be rotated relative to at least one other base body part. Such base body parts may be, for example, a rotatable attachment on a fastening base. Alternatively, a rotatable part of the control module base, comprising the near-field communication means, may be allowed to rotate, given a fixed arrangement of the control module on a stationary part of the control module base, until the positioning of the near-field communication means with respect to the control module or a read unit may be optimized.

The object set in the introductory part is also achieved by a control module which can be fastened to a control module base according to the invention as described herein and which has a near-field communication unit. The near-field communication unit is preferably in the form of a read unit, by means of which the information in the near-field communication means of the control module base can be read out via the control module. In particular, it is possible to communicate with the near-field communication means of the control module base by means of the near-field communication unit.

It will readily be appreciated that the control module has a plurality of electrical and/or electronic components by means of which the control module may form part of a luminaire network, may communicate within the luminaire network, may possibly control the luminaire network and/or may also operate the lighting means or the luminaire. By way of a non-limiting example, the electronic components may comprise a control unit on which, for example, programs for controlling the control module run, means for supplying power, means for communicating with other control modules and/or any other servers or segment controllers in the luminaire network and possibly also sensors for recording environmental data.

By integrating the near-field communication unit into the control module, it is possible to read out the information from the near-field communication means, in particular, in an automated manner, and accordingly make the information available automatically. To this end, for example, a controller of the control module may trigger and control reading of the information from the near-field communication means and ensure that this information is transmitted to a server or other responsible controller by means of at least one communication unit, or possibly also retrieves the corresponding luminaire-specific information necessary for operating the luminaire from a database itself. Similarly, a list which comprises a large number of identifiers and associated luminaire-specific information may possibly be stored in the controller of the control module.

In order to change the information which is obtained from the near-field communication means, the near-field communication unit can be designed to write to the near-field communication means of the control module base.

Communication in the luminaire network, which is preferably in the form of a mesh network, is performed, in particular, by means of middle-distance communication, for example by means of radio communication. Other alternative networks may be organized, for example, in the form of a star, and/or may operate on a powerline basis. Long-distance communication with servers which are also situated further away and by means of which the network can be operated can be performed by means of telephone and/or Internet connections or else combinations of connections of this kind with wireless local area network (WLAN) connections.

The near-field communication unit is preferably in the form of an RFID read unit or has at least one RFID read unit. The near-field communication unit can be configured to read further near-field communication means, for example, a near-field communication means of the luminaire, by means of near-field communication and/or can control one or more further read units. The control module, in particular, by way of one or more NFC read units, can also check, for example, sensors which are situated in positions of the luminaire housing which are remote from the control module base.

The near-field communication unit preferably comprises an antenna which, due to its planar configuration, runs parallel to the end face of the control module at least in sections, so that the control module can be configured to be as flat as possible. At the same time, transmission and reception direction of the antenna may be formed substantially in the direction of the control module base, so that reception and transmission of energy and/or information is also possible through housing walls of the control module and/or of the control module base. In this case, the end face of the control module is the face which is directed towards the control module base and which can form a support area for the control module irrespective of any possible projecting contacts.

The antenna, in its planar configuration, is preferably formed parallel to a printed circuit board which has at least some of the electrical or electronic components. A saving in installation space is again correspondingly obtained in this way. The control module may be of relatively flat construction accompanied by optical advantages for arrangement on a luminaire implemented as a street lamp.

In particular, the antenna may comprise part of an antenna printed circuit board which is arranged in the control module and shielded from the printed circuit board, and, in particular, is arranged in a lower portion of the control module which faces towards the control module base when assembled.

The ability to fix the antenna printed circuit board with respect to the antenna alone ensures correct orientation of the printed circuit board in relation to the control module base so that data can be transmitted with greater process reliability. Shielding of any sources of interference which may be present in the control module also improves the reliability of data transmission.

In order to further utilize the installation space which is taken up by the antenna printed circuit board, the antenna printed circuit board may furthermore be connected via lines to weak current contacts which have corresponding mating pieces in the control module base and which can be used, for example, to transmit the commands on a '0 to 10V' or digital addressable lighting interface (DALI) protocol.

The term "weak current" as used herein is intended to refer to current values of less than 1 A.

Four weak current contacts are preferably connected on the antenna printed circuit board, two of which being used for dimming, another one of which being used for a 12V direct current, and a further weak current contact being used for a sensor input. However, other numbers of weak current contacts may be provided according to the particular implementation.

As the antenna printed circuit board is preferably arranged in a portion of the control module which is to be located close to the control module base, the antenna printed circuit board preferably has recesses for conducting further connections to the power supply of the control module. Interference in the NFC communication, which is provided with low energies, is avoided by means of shielding the antenna printed circuit board from other printed circuit boards and other electrical units within the control module.

According to a large number of different configurations, it has surprisingly been found that reading out information from an RFID transponder is improved, in particular, when the antenna according to a further exemplary embodiment of the invention has curved sections which are at different radial distances from a longitudinal axis. The longitudinal axis is, in particular, perpendicular to the plane of the antenna or corresponds to a longitudinal axis of the control module.

The curved sections of the antenna may be arranged around the longitudinal axis and are connected to one another, in particular, by means of substantially straight antenna sections which are arranged in radial directions on the antenna printed circuit board. The substantially straight antenna sections which connect these curved sections may also connect the curved sections with a relatively acute or obtuse angle relative to one another rather than in the radial direction. However, it is advantageous that the antenna can have a plurality of encircling sections or conductor tracks and utilizes the available installation space in the control module. The control module is preferably provided with a cover having a generally cylindrical shape with a circular cross-section as viewed in a longitudinal direction parallel to or coincident with the longitudinal axis.

The control module according to the invention may be provided with a module information carder for marking the position of the near-field communication unit and/or for marking the positioning of the near-field communication means as early as at the factory, so that it is possible to check for correct arrangement for the purpose of integration of the control module in the or on the control module base.

The object set in the introductory part may also be achieved by an arrangement according to Claim 18, which arrangement comprises a control module base and a control module according to the invention as described herein. This arrangement is provided with the described advantages. In particular, a luminaire network can be set up more quickly, with greater process reliability, and more easily by means of the use of an arrangement of this kind since luminaire-specific information can be read out from the control module base, associated with the luminaire, in an automated manner. This simplifies operational start-up or commissioning of the associated control modules, and, therefore the process of setting up and the operation of the luminaire network.

The control module comprises a controller which is configured to drive the near-field communication unit, and the associated information may also be read out from a database which is to be associated with the luminaire network or may be received by means of an associated server. The required programming and configuration of the controller and the integration of a near-field communication unit can readily be implemented.

Figure 2:
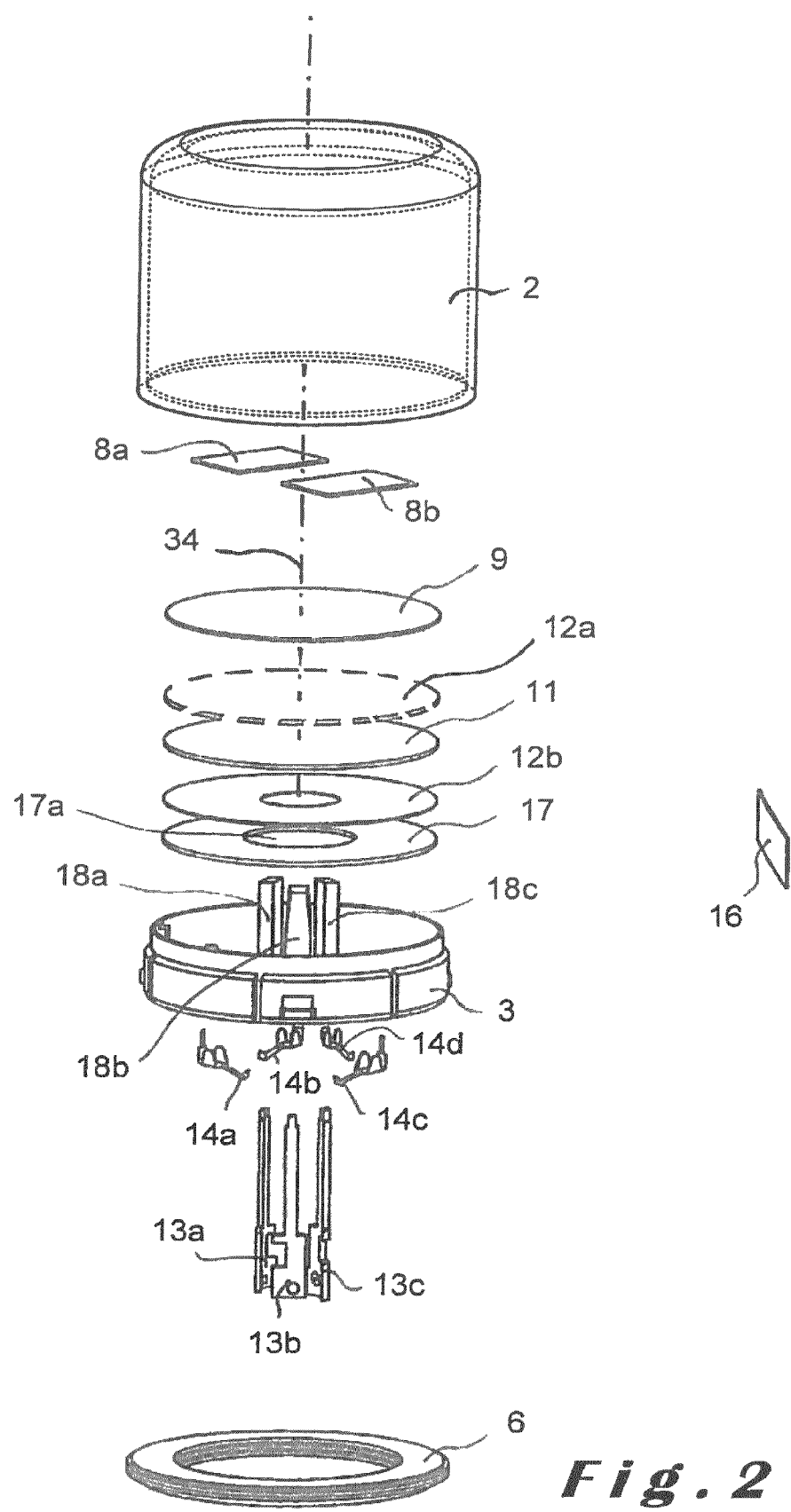
Figure 3:
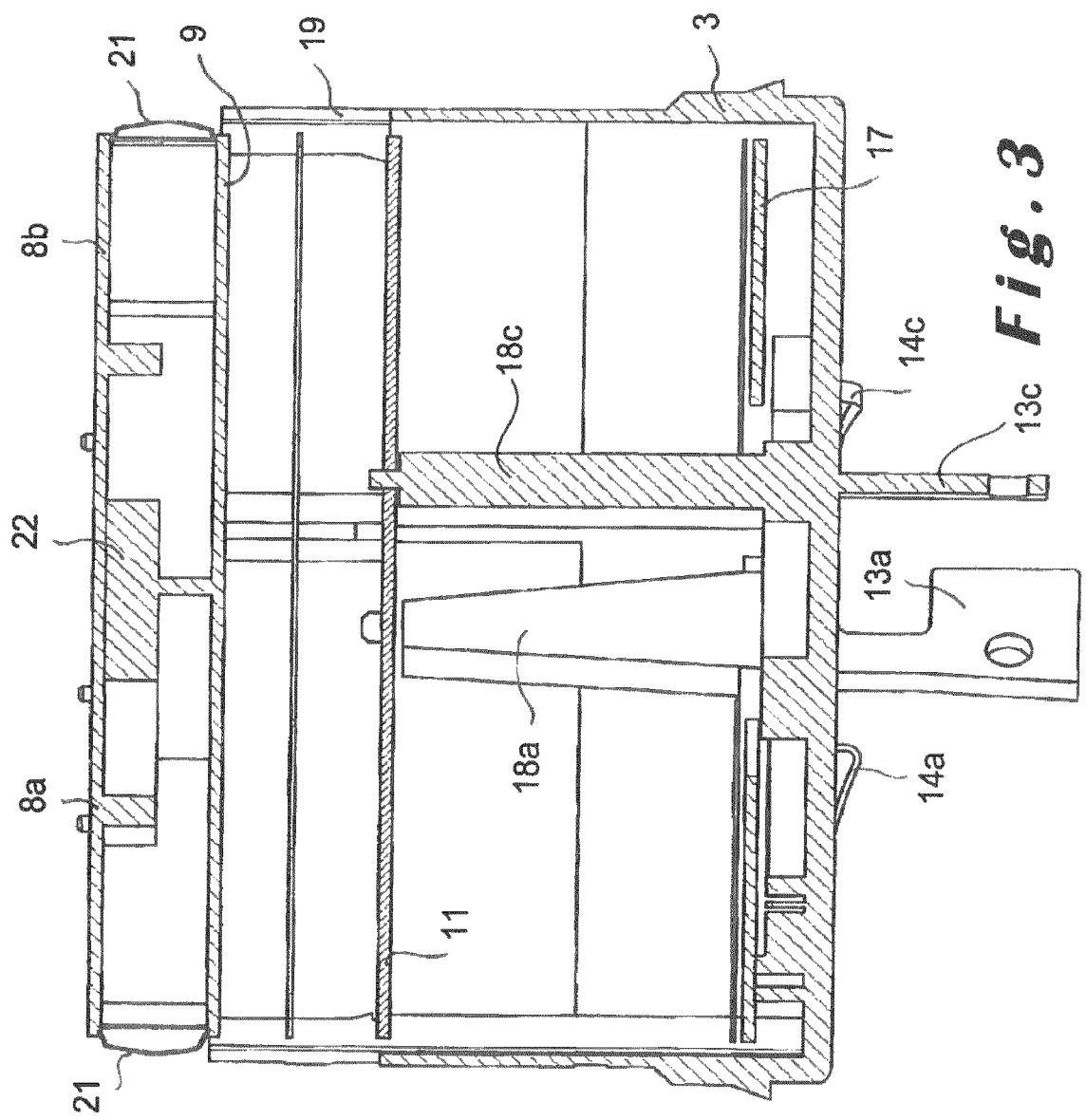
Figure 4:
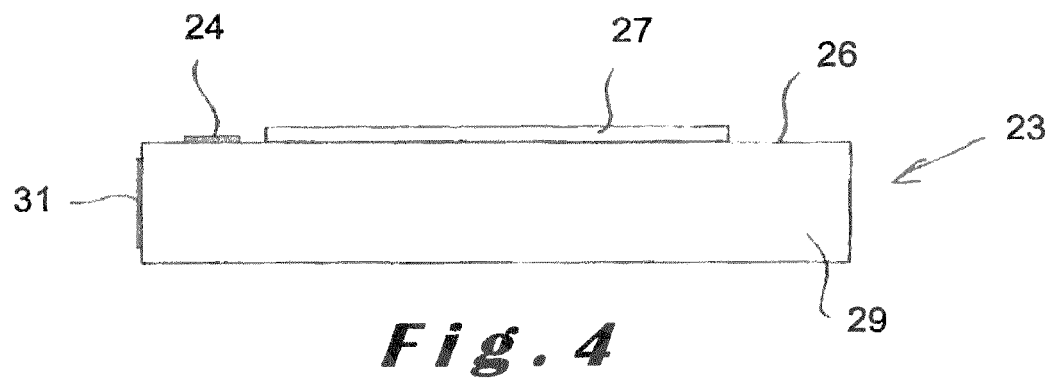
Figure 5:
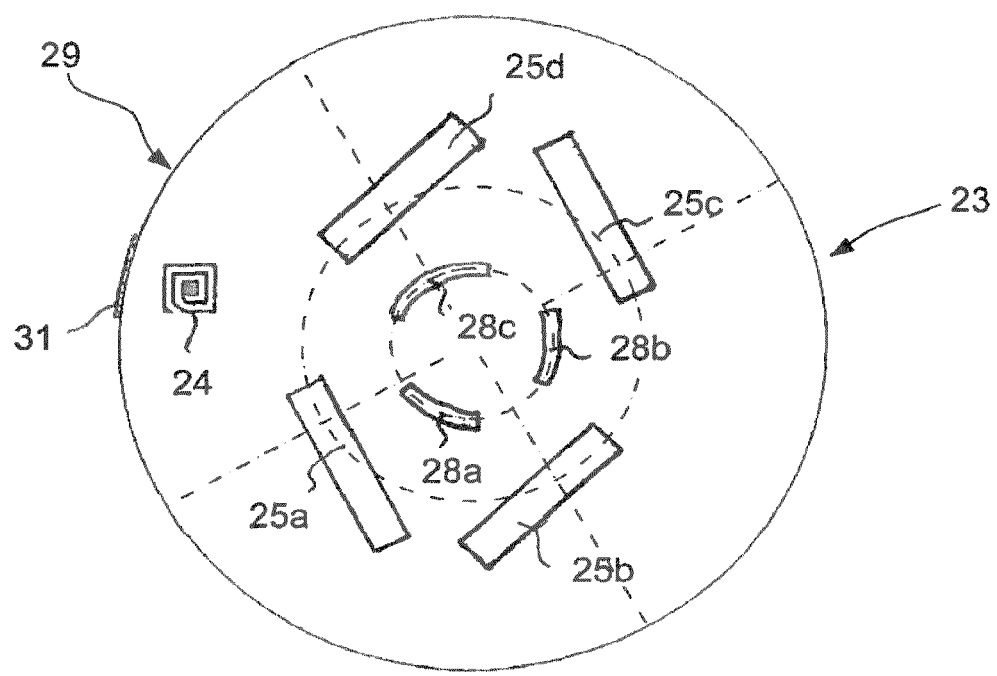
Figure 6:
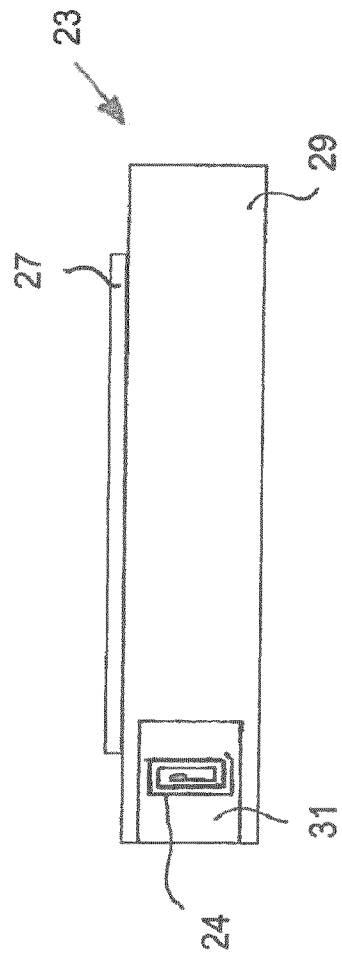
Figure 7:
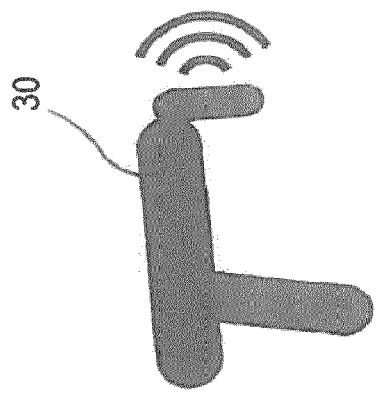
Figure 7:
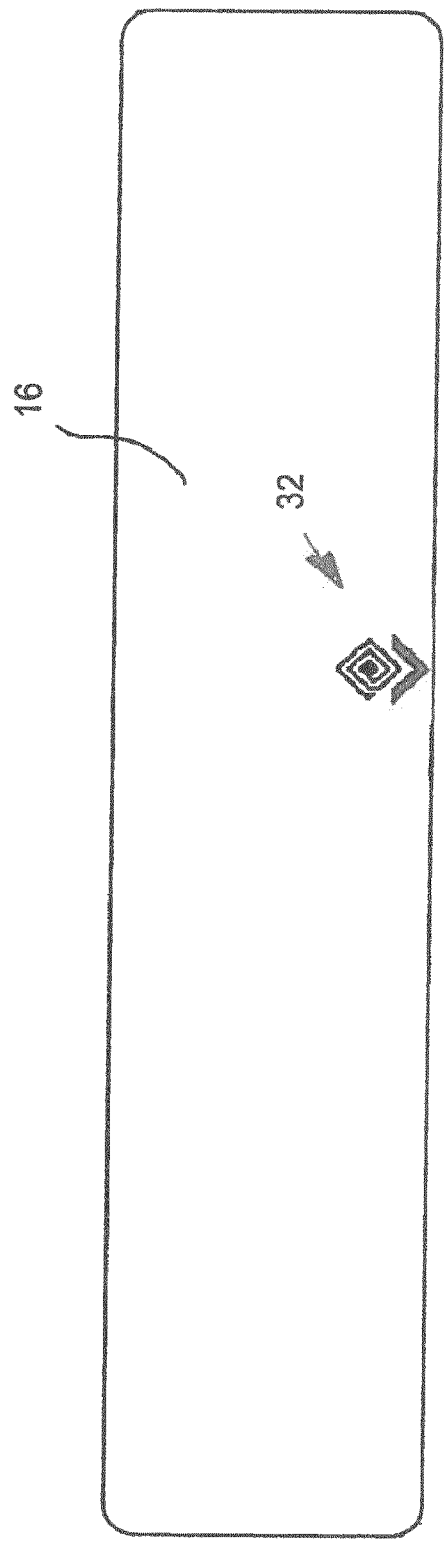
Figure 8:
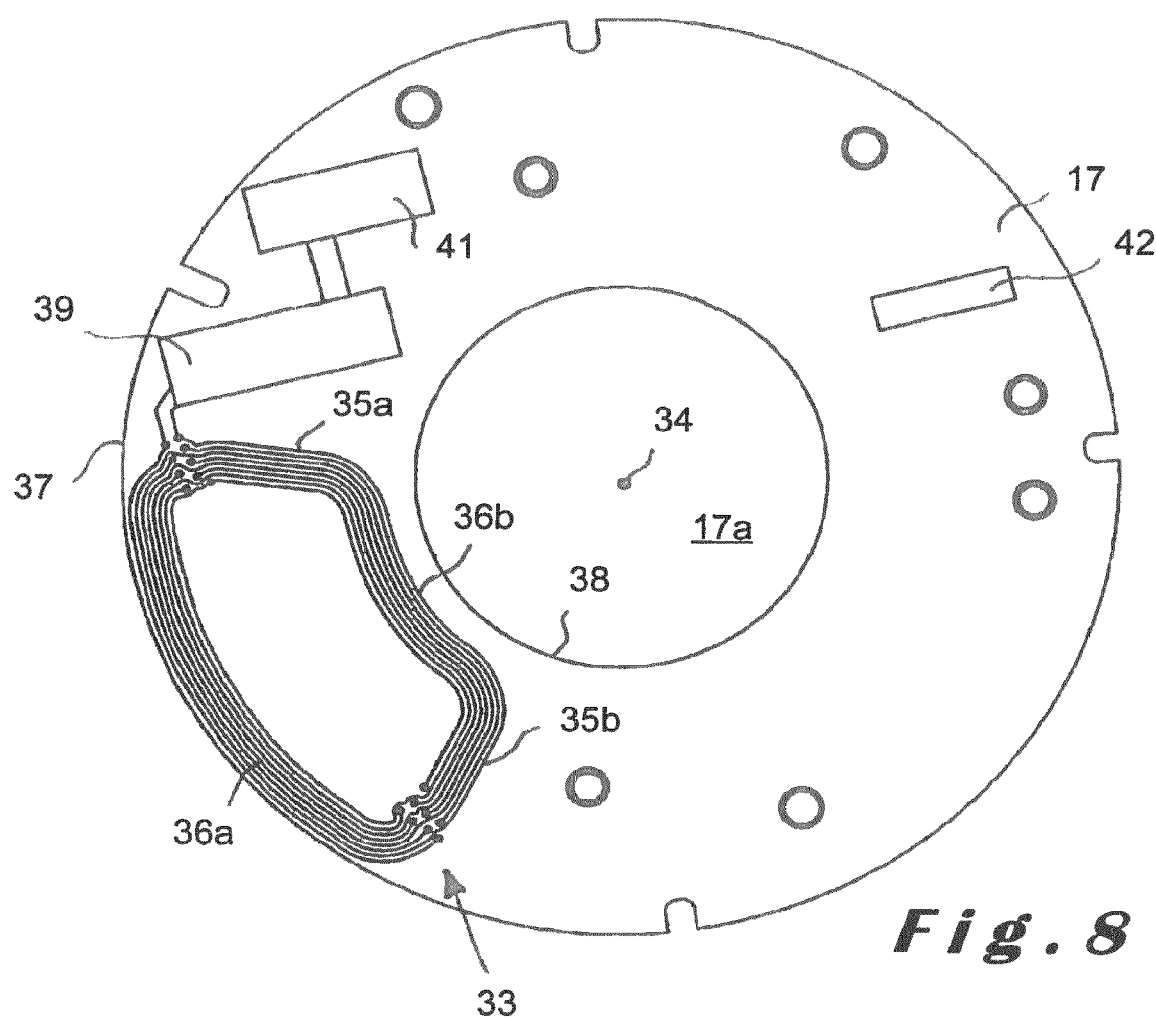

Further advantages and details of the invention become apparent from the following description of figures. In the schematic illustrations:

FIG. 1 shows a perspective illustration of a control module according to the present invention, FIG. 2 shows an exploded illustration of the control module shown in FIG. 1, FIG. 3 shows a vertical section through a portion of the control module shown in FIG. 1, FIG. 4 shows a sectional view of a control module base according to the present invention, FIG. 5 shows a plan view of the control module base as shown in FIG. 4, FIG. 6 shows a side view of a control module base according to another embodiment of the present invention, FIG. 7 shows a portion of an information carrier according to the present invention as shown in FIG. 1, and FIG. 8 shows a plan view of an antenna printed circuit board according to the present invention as shown in FIG. 1.

Single technical features of the exemplary embodiments described below may also be combined to form other embodiments according to the present invention in combination with exemplary embodiments that are described herein. In addition, combinations of the exemplary embodiments with the features of the claims are also in accordance with the present invention.

Where appropriate, elements that have the same functional effect are provided with identical reference numerals.

FIGS. 1 to 3 illustrate a control module 1 according to the present invention which has a housing which comprises an outer housing part or cover 2 and an inner housing part 3. An end face 4 of the inner housing part 3 is additionally provided with a seal 6 by means of which a sealed closure with a control module base according to the present invention (not shown in FIGS. 1 to 3) can be established.

A series of components of the control module 1 are schematically illustrated. These components include antennas 8a, 8b which can be driven by means of a processor printed circuit board 9 which has at least one microprocessor and further electrical or electronic components (not shown) for managing and/or controlling the operation of the antennas 8a, 8b. Although two antennas 8a, 8b are shown, it will readily be appreciated that any suitable number of antennas may be implemented.

The control module 1 also includes a main printed circuit board 11 on which at least one microprocessor and further electrical or electronic components (also not shown). The main printed circuit board 11 is intended to be located adjacent to the processor printed circuit board 9 and is configured to control the operation of at least some of the functionality of the control module 1.

In order to improve the insulation between the processor printed circuit board 9 and the main printed circuit board 11, a shielding film or foil 12a is provided between the processor printed circuit board 9 and the main printed circuit board 11. Relays, transformers and capacitors which are used for supplying power to the control module 1, and also further electrical or electronic components, are arranged on the main printed circuit board 11. By arranging the relays, transformers and capacitors etc. on a surface of the main printed circuit board 11 which is not adjacent to the processor printed circuit board 9, and, arranging components on a surface of the processor printed circuit board 9 which is not adjacent to the main printed circuit board 11, the air gap between the two printed circuit boards can substantially be minimized.

Power is supplied to the control module 1 mainly by means of solid rotary contacts and/or plug contacts 13a, 13b, 13c which are made from brass, for example, and which engage into associated and correspondingly shaped recesses in a control module base (not shown in FIGS. 1 to 3) in order to fasten the control module 1 thereto. Each contact 13a, 13b, 13c is designed to be different to each of the other contacts.

Like the contacts 13a, 13b, 13c, the recesses in the associated control module base into which the contacts are inserted are designed to be different from one another so that unambiguous positioning of the control module 1 on the control module base is possible. The recesses are used as fastening means.

As shown, the contacts 13a, 13b, 13c extend beyond the lower side 4. Four weak current contacts 14a, 14b, 14c, 14d (only contact 14c can be seen in FIG. 1 and only contacts 14a and 14c can be seen in FIG. 3) are arranged on the lower side 4.

Both the contacts 13a, 13b, 13c and the weak current contacts 14a, 14b, 14c, 14d are partially arranged in the inner housing part 3 and fixed therein.

In FIG. 1, a label or module information carrier 16 is illustrated in a position immediately before mounting the outer housing part 2 to the inner housing part 3 of the control module 1. The label or module information carrier 16 accordingly extends partially from the outer housing part or cover 2.

An antenna printed circuit board 17 (shown in FIG. 2) is arranged within an outer periphery or boundary of the inner housing part 3 of the control module 1. The antenna printed circuit board 17 has a recess 17a through which parts 18a, 18b, 18c of the lower housing part 3 which have plug contacts 13a, 13b, 13c can protrude. Accordingly, the plug contacts 13a, 13b, 13c can pass through as far as the main printed circuit board 11 and can be connected there. A film-like or foil-like shielding 12b is also arranged between the antenna printed circuit board 17 and the main printed circuit board 11, the shielding 12b also having a recess (not labelled for clarity) through which the parts 18a, 18b, 18c can protrude. The label or module information carrier 16 is designed to mark the position of the near-field communication unit or to indicate the correct positioning of the near-field communication means.

As little space is required for the antenna printed circuit board 17 in the direction of a longitudinal central axis 34 (FIG. 2) and the antenna printed circuit board 17 is located in a lower portion of the inner housing part 3 of the control module 1 as shown in FIG. 3, the lower portion of the inner housing part has a relatively large amount of installation space available for the components of the main printed circuit board 11. The main printed circuit board 11 is fastened to the inner housing part part 3 of the housing by means of the parts 18a, 18b, 18c. The processor printed circuit board 9, like the main printed circuit board 11, is arranged on the inner housing part 3 by means of rod-like printed circuit board holders 19 as shown in FIG. 3. The three rod-like printed circuit board holders 19, only one of which is labelled in FIG. 3, are integrally formed with the inner housing part 3 and are distributed around the processor printed circuit board 9 and the main printed circuit board 11 in a regular manner around the circumference of the inner housing part 3 and of each printed circuit board. The printed circuit board holders 19 may be constructed from two or more rod-like holding elements which are located not only regularly around the circumference but also at suitable locations on the edge of the inner housing part 3.

The antennas 8a, 8b are connected to the processor printed circuit board 9 by means of flexible printed circuit board parts 21 and are held in position within the inner housing part 3 by means of an antenna holder 22 which is arranged on the processor printed circuit board 9.

Turning now to FIGS. 4 and 5, a side view of a control module base 23 shows an arrangement of a near-field communication means 24, in the form of an RFID transponder, on an upper side or top side 26 of the control module base 23. Recesses 28a, 28b, 28c (FIG. 5) are of different sizes, as described above, for receiving the plug contacts 13a, 13b, 13c. The recesses 28a, 28b, 28c are arranged on a raised portion 27 of the control module base 23 (FIG. 4). Due to the shaping, the recesses 28a, 28b, 28c serve to fix the control module 1, preferably in a latching manner, and therefore form fastening means for fastening the control module 1 on the upper or top side 26 of the control module base 23.

Conductive contact strips 25a, 25b, 25c, 25d serve to make contact with respective ones of the weak current contacts 14a, 14b, 14c, 14d as shown in FIG. 2. The contact strips 25a, 25b, 25c, 25d form conductive connection contacts for the control module base 23 with further contact means, not shown, which line the inner surfaces of the recesses 28a, 28b, 28c. Power is supplied to the control module 1 by way of the further contact means arranged in the recesses 28a, 28b, 28c (not shown) and the plug contacts 13a, 13b, 13c of the control module 1.

An information carrier 31, which is fitted on a lateral surface 29 (FIG. 4), indicates the location of the RFID transponder 24. The RFID transponder 24 can also be read by the operating personnel using a hand-held read device 30 (FIG. 6), so that, for example, in the event of a fault, any information which the control module 1 contains, or which has been transmitted to a server, can be checked. The upper or top side 26 and the lateral surface 29 of the base body are angled relative to one another. In one embodiment, the upper or top side 26 is substantially orthogonal (at substantially 90 degrees) to the lateral surface 29 but it will be appreciated that other angles are possible.

In a further exemplary embodiment of a control module base 23, as shown in FIG. 6, the near-field communication means 24, in the form of an RFID transponder as described above with reference to FIGS. 4 and 5, is fixed on the lateral surface 29 by means of the information carrier 31. The information carrier 31 may also have means for indicating the presence of the transponder 24 (which may not always be visible), for example, coloured markings on the outside of the information carrier 31. The information carrier 31 may be in the form of a label.

The transponder 24 may be incorporated into the information carrier 31 so that it is located in or between one or more layers of the information carrier 31. The information carrier 31 may comprise, for example, a multi-layered label with an internal adhesive layer and an external water-repellent layer.

The external water-repellent layer is preferably constructed from polypropylene (PP), for example, but it will be appreciated that any other suitable material having water-repellent properties may be used. The adhesive and the external layer of the information carrier 31 are designed to be suitable for outdoor use and have a service life that at least matches the projected 15-year service life of the control module 1. The adhesive and external layer are UV-resistant and resistant to sunlight and retain their properties in a temperature range of from −40° C. to 75° C.

FIG. 7 illustrates the module information carrier 16 of the control module 1 in more detail. The information carrier 16 has an indicator means 32 which corresponds, for example, with an indicator of the information carrier 31 of the control module base 23 in the fastening position of the arrangement according to the present invention in order to be able to check for correct positioning of the NFC elements of the control module base 23 and the control module 1 after assembly.

FIG. 8 illustrates the antenna printed circuit board 17 of the control module 1 in more detail. As described above, the antenna printed circuit board 17 is located in inner housing part 3 of the control module 1 with the longitudinal central axis 34 passing through the aperture 17a formed therein (FIG. 2). The antenna printed circuit board 17 is fitted with an antenna 33 which, with respect to the longitudinal central axis 34 (shown in FIG. 2), has curved sections 36a, 36b which are at different radial distances from the longitudinal central axis and substantially straight sections 35a, 35b connecting the curved sections 36a, 36b to one another as shown.

Each of the curved sections 36a, 36b and the substantially straight sections 35a. 35b comprises a plurality of conductor tracks of a NFC antenna which are formed as bundles. The curved sections 36a, 36b are arranged at different radial distances from the longitudinal central axis 34 with one curved section 36a arranged on an outer edge 37 of the antenna printed circuit board 17 and another curved section 36b is arranged adjacent an inner edge 38 defining the aperture 17a. The straight sections 35a, 35b are arranged to extend substantially in a radial direction with respect to the longitudinal central axis between the outer edge 37 and an inner edge 38 defining the aperture 17a of the printed circuit board 17. In this embodiment, it will readily be understood that the antenna printed circuit board 17 is in the form of an annular disc.

Together with an associated electronics unit 39, the antenna 33 forms the near-field communication unit which can communicate with the components of the control module 1 which are arranged, in particular, on the processor printed circuit board 9. As described above, the processor printed circuit board 9 is arranged to be parallel with the antenna printed circuit board, and therefore to be parallel to the antenna 33. An interface 41, which is illustrated in the form of a block, is provided for the electronics control unit 39. The connections, not illustrated in detail, to the weak current contacts 14a, 14b, 14c, 14d (FIG. 2) can be realized by means of a further interface 42.

The antenna 33 runs on the antenna printed circuit board 17, due to its planar configuration, parallel to the lower side 4 of the inner housing part 3. The lower side 4 forms the fastening side of the control module 1 since it is the side which is directed towards the control module base 23 and on which fastening and/or sealing means 6 are arranged.

Although specific implementations of the control module 1 and the control module base 23 are described above, these implementations are by way of example and other implementations for the control module 1 and the control module base 23 are possible.

It will be appreciated that the functionality of the control module within the luminaire network is not essential to the present invention and therefore has not been described in detail here.

The invention claimed is:

1. A control module configured for the integration of a luminaire with which the control module is associated, into a luminaire network, said control module comprising a plurality of at least electrical components and electronic components and a near-field communication unit;

said control module being configured to be mounted to a control module base and said control module having an end face configured to be directed towards the control module base and provided with outwardly projecting contacts configured to be received in recesses in the control module base; and wherein the outwardly projecting contacts are solid rotary contacts and/or plug contacts configured to provide power to the control module, and the control module is further provided with weak current contacts, preferably two of which being used for dimming, another one of which being used for a 12V direct current, and a further weak current contact being used for a sensor input.

2. The control module according to claim 1, wherein the near field communication means comprises a part of an antenna printed circuit board arranged to be directed towards the end face; and wherein the antenna printed circuit board is connected via lines to weak current contacts which have corresponding mating pieces in the control module base and which are configured to be used to transmit commands on a 0 to 10V or digital addressable lighting interface, DALI protocol.

3. The control module of claim 1, wherein the near-field communication unit is configured to transmit data using any one of the following: radio frequency identification, RFID, Bluetooth Low Energy, BLE technology, infrared technology.

4. The control module of claim 1, wherein the electronic components comprise any one or more of the following: a control unit configured to run programs for controlling the control module, a means for supplying power, a sensor for recording environmental data.

5. The control module of claim 1, wherein the near-field communication unit is configured to read a near-field communication means of the luminaire, by means of near-field communication.

6. The control module of claim 1, wherein the control module is configured to check a sensor of the luminaire using the near-field communication unit.

\* \* \* \* \*